(No Model.)

C. A. MAHLE.
TOY.

No. 454,369. Patented June 16, 1891.

Witnesses

Inventor
C. A. Mahle,
per Lehmann & Pattison
Attorneys.

UNITED STATES PATENT OFFICE.

CLEMENCE A. MAHLE, OF CORRY, PENNSYLVANIA.

TOY.

SPECIFICATION forming part of Letters Patent No. 454,369, dated June 16, 1891.

Application filed February 3, 1891. Serial No. 380,059. (No model.)

*To all whom it may concern:*

Be it known that I, CLEMENCE A. MAHLE, of Corry, in the county of Erie and State of Pennsylvania, have invented certain new and useful Improvements in Toys; and I do hereby declare the following to be a full, clear, and exact description of the invention, such as will enable others skilled in the art to which it pertains to make and use it, reference being had to the accompanying drawings, which form part of this specification.

My invention relates to an improvement in toys; and it consists in the construction and arrangement of parts, which will be fully described hereinafter.

The object of my invention is to provide a toy which will produce sounds of different kinds, according to the figure of the bird or animal that is placed upon the cylinder, and thus afford the children an endless source of amusement.

Figure 1:
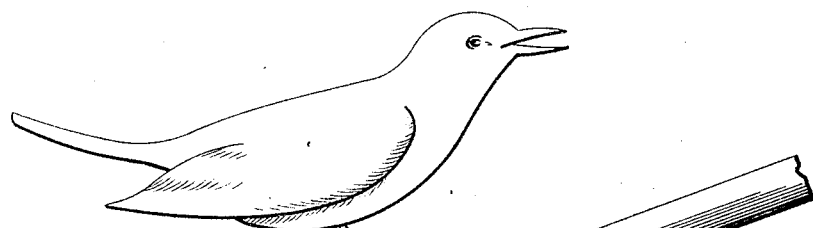
Figure 2:
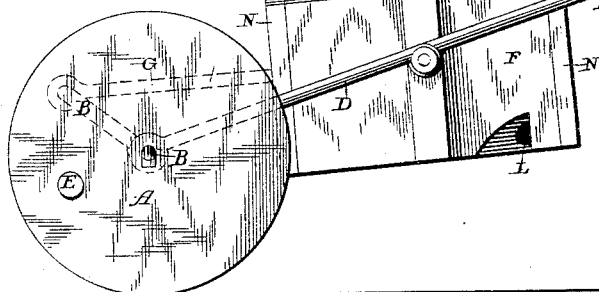
Figure 3:
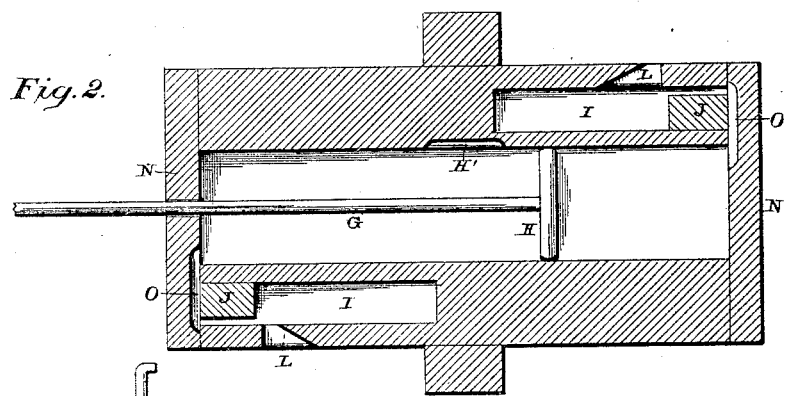

Figure 1 is a side elevation of a toy to which my invention is applied. Fig. 2 is a horizontal section taken through the cylinder. Fig. 3 is a detail view.

A represents the two wheels, and B the crank, which is rigidly secured thereto so as to revolve with them. These wheels are to be operated by being pushed along the floor by means of the handle C and the frame D, which is secured to the lower end of the handle and in which the axle is journaled, or the wheels can be turned by taking hold of the crank E, which projects from one of the wheels. The frame is made of wire, as here shown, or the end of the handle may be split and steamed, so as to be bent into the required shape, just as may be desired.

The cylinder F, upon which the figure of a bird or animal of any kind is placed, is journaled in the frame or the ends of the handle, so as to have an oscillating movement, and working back and forth in the cylinder is the piston H, to which the piston-rod G is secured, and which piston is given a reciprocating motion when the wheels are made to revolve. The piston fits loosely in the cylinder, and in order to prevent a regular whistling or blowing sound from being made there is made in the side of the bore of the cylinder any desired number of recesses H', so as to allow the air to escape freely past the piston at this point, and thus break the continuity of the sound that is produced. If it were not for the recess or recesses, the regular steady forcing of the air by the piston would produce an even sound which would be very unlike the twittering or chirping of a bird or the sound made by an animal. In most cases one of these recesses at the center of the cylinder will be sufficient; but there may be any desired number, according to the sound that is to be imitated.

In one or both ends of the cylinder there is formed a recess or cavity I, which is made of a length which is proportioned to the sound that is to be produced. If a deep sound is wanted, this cavity or recess will be made correspondingly deep; but if a lighter or shriller one is desired the depth of the cavity is decreased accordingly, as well as the diameter of the bore or cavity. In the outer end of this cavity or recess is placed a plug J, which is cut away on one side so as to allow the air from the cylinder to be forced into the cavity, and through the side of the cylinder at the inner end of the plug is made an opening L, through which the air escapes after it has reverberated in the cavity or opening. The heads N of the cylinder are provided with recesses or cavities O opposite the plugs, so as to allow the air to pass over the ends of the plugs into the recesses or cavities, as shown. There may be one, two, or more of the cavities in each end of the cylinder, or there may be only one cavity to each cylinder, according to the sound that is to be produced. If two or more cavities are made in one or both ends of the cylinder and the cavities are of unequal size and depth, then a compound sound is produced, according to the bird or animal it is desired to imitate. The oscillation of the cylinder gives to the figure of the animal or bird a rocking or tilting movement at the same time that the sound is being produced, and thus adds to the attractiveness of the toy.

Having thus described my invention, I claim—

1. The wheels, the cranked axle secured thereto, the piston-rod, and the piston, combined with a cylinder provided with a recess or groove in the side of its bore, and a means at one or both ends of the cylinder for producing a musical sound as the air is forced back and forth by the piston, substantially as shown.

2. In a toy, the wheels, the cranked axle operated thereby, the piston-rod, and a piston, combined with a cylinder having a thick wall, which is provided with a cavity or recess made in one end thereof and a plug placed in the outer end of the cavity or recess, there being formed an opening through the side of the cylinder into the cavity or recess for the passage back and forth of the air, substantially as described.

3. In a toy of the character described, a cylinder, the supporting-wheels, a connection between the wheels and the piston for reciprocating it, a whistle connected with the end of the cylinder, and a groove or recess made in the bore of the cylinder between its ends for breaking the continuity of the sound, the parts combined substantially as shown.

In testimony whereof I affix my signature in presence of two witnesses.

C. A. MAHLE.

Witnesses:
 F. A. LEHMANN,
 THOMAS J. STALEY.